(12) United States Patent
van Zon et al.

(10) Patent No.: US 12,095,591 B2
(45) Date of Patent: Sep. 17, 2024

(54) METHOD FOR OPERATING AN AGRICULTURAL MACHINE HAVING A TRACTOR AND AN IMPLEMENT HITCHED TO THE TRACTOR AND AGRICULTURAL MACHINE

(71) Applicant: Kverneland Group Mechatronics B.V., Nieuw-Vennep (NL)

(72) Inventors: Caspar Hubert Wim van Zon, Sassenheim (NL); Benno Mosterd, Nieuw-Vennep (NL)

(73) Assignee: Kverneland Group Mechatronics B.V., Nieuw-Vennep (NL)

( * ) Notice: Subject to any disclaimer, the term of this patent is extended or adjusted under 35 U.S.C. 154(b) by 995 days.

(21) Appl. No.: 16/987,875

(22) Filed: Aug. 7, 2020

(65) Prior Publication Data

US 2021/0044451 A1  Feb. 11, 2021

(30) Foreign Application Priority Data

Aug. 9, 2019 (EP) .................................. 19191032

(51) Int. Cl.
*H04L 12/40* (2006.01)
*A01B 76/00* (2006.01)
*G05B 15/02* (2006.01)

(52) U.S. Cl.
CPC ........ *H04L 12/40136* (2013.01); *A01B 76/00* (2013.01); *G05B 15/02* (2013.01);
(Continued)

(58) Field of Classification Search
CPC ......... H04L 12/40136; H04L 12/40169; H04L 2012/40215; H04L 2012/40273; A01B 76/00; G05B 15/02
See application file for complete search history.

(56) References Cited

U.S. PATENT DOCUMENTS 6,167,337 A * 12/2000 Haack ...................... E02F 9/26
   701/1
11,064,645 B2 * 7/2021 Shearer .................. B60K 23/00
(Continued)

FOREIGN PATENT DOCUMENTS

| EP | 1997686 A2 | 12/2008 |
| EP | 3323280 A1 | 5/2018 |
| EP | 3438770 A1 | 2/2019 |

OTHER PUBLICATIONS

European Patent Office Search Report, in reference to co-pending European Patent Application No. 19191032.2-1004 filed Feb. 28, 2020.

*Primary Examiner* — Hunter B Lonsberry
*Assistant Examiner* — Harrison Heflin
(74) *Attorney, Agent, or Firm* — Leason Ellis LLP

(57) ABSTRACT

An agricultural machine having a tractor and an implement hitched thereto and a method for operating same. The method comprising connecting a control device on the tractor and a control unit on the implement to a data bus. The control device processes a plurality of implement operation parameters and the control unit is assigned to a functional element of the implement. Furthermore, establishing data communication between the control device and the control unit through the bus, comprising, transmitting a response data message from the control unit to the control device indicating the control unit being configured to provide present parameter values for only a subset of implement operation parameters, but not a subset of remaining implement operation parameters. Further, future data collecting messages transmitted from the control device to the control unit are limited to requesting present parameter values for the subset of implement operation parameters.

9 Claims, 3 Drawing Sheets

(52) U.S. Cl.
CPC ............... *H04L 12/40169* (2013.01); *H04L 2012/40215* (2013.01); *H04L 2012/40273* (2013.01)

(56) References Cited

U.S. PATENT DOCUMENTS

| | | | |
|---|---|---|---|
| 2011/0270495 A1* | 11/2011 | Knapp | A01D 41/127 701/50 |
| 2017/0318743 A1* | 11/2017 | Sauder | A01B 79/005 |
| 2019/0150357 A1* | 5/2019 | Wu | H04N 7/188 |

* cited by examiner

| Category | Category name | Parameter identifier | Index | Parameter |
|---|---|---|---|---|
| C1 | General Inputs | P1 | 0 | ECU power 1 |
| C1 | General Inputs | P2 | 5 | ACT power 1 |
| C1 | General Inputs | P3 | 6 | ACT power 2 |
| C1 | General Inputs | P4 | 7 | ACT power 5V |
| C1 | General Inputs | P5 | 8 | CAN 1 High |
| C1 | General Inputs | P6 | 9 | CAN 1 Low |
| C1 | General Inputs | P7 | 10 | CAN 2 High |
| C1 | General Inputs | P8 | 11 | CAN 2 Low |
| C1 | General Inputs | P9 | 14 | ECU Temperature |
| C2 | General ISOBUS | P10 | 19 | Connected to UT instance |
| C2 | General ISOBUS | P11 | 20 | UT boot time |
| C2 | General ISOBUS | P12 | 21 | Number of UTs on the bus |
| C3 | Ploughs General | P13 | 0 | Machine work mode |
| C3 | Ploughs General | P14 | 1 | Plough mechanical state |
| C3 | Ploughs General | P15 | 2 | Plough on preset |
| C3 | Ploughs General | P16 | 3 | Furrow width blockage |
| C3 | Ploughs General | P17 | 4 | Turn Angle blockage |
| C3 | Ploughs General | P18 | 5 | Depth Wheel blockage |
| C3 | Ploughs General | P19 | 6 | First Furrow blockage |
| C3 | Ploughs General | P20 | 0 | Machine work mode |
| C3 | Ploughs General | P21 | 1 | Plough mechanical state |
| C3 | Ploughs General | P22 | 2 | Plough on preset |
| C3 | Ploughs General | P23 | 3 | Furrow width blockage |

Fig. 3

METHOD FOR OPERATING AN AGRICULTURAL MACHINE HAVING A TRACTOR AND AN IMPLEMENT HITCHED TO THE TRACTOR AND AGRICULTURAL MACHINE

CROSS-REFERENCE TO RELATED APPLICATIONS

This application claims priority to European Patent Application No. EP 19191032.2, filed 9 Aug. 2019, the disclosure of which is herein incorporated fully by reference.

TECHNICAL FIELD

The present disclosure refers to a method for operating an agricultural machine having a tractor and an implement hitched to the tractor, and an agricultural machine.

BACKGROUND

Such agricultural machine may be provided with different kinds of implement such as plough, baler, seeder, sprayer or the like. On the tractor there is a control device which may exchange electronic data with control units provide it on the implement through a data bus. For example, data indicative for a plurality of implement operation parameters may be received in the control device through the data bus from one or more control units provided on the implement, wherein the control units are assigned to at least one functional element of the implement, for example for controlling working tools of the implement. The amount of data which are available from the control units provided on the implement has increased constantly. This provides a burden to the data transmission capacity of the data bus used for data communication between the control device on the tractor and the control unit(s) on the implement.

SUMMARY

Disclosed herein is a method for operating an agricultural machine having a tractor and an implement hitched to the tractor and an agricultural machine for which data communication through the data bus connecting elements or modules on both the tractor and the implement is optimized.

According to one aspect, a method for operating an agricultural machine having a tractor and an implement hitched to the tractor is provided, the method comprising: connecting a control device provided on the tractor to a data bus, wherein the control device is configured to process data indicative for a plurality of implement operation parameters assigned parameter identifiers P1 to Pn (n≥2); connecting a control unit provided on the implement to the data bus, wherein the control unit is assigned to at least one functional element of the implement; and establishing data communication between the control device and the control unit through the data bus.

The establishing of the data communication comprises: in response to connecting the control unit to the data bus, transmitting a response data message from the control unit to the control device, the response data message indicating the control unit being configured to provide present parameter values for only a subset of implement operation parameters assigned parameter identifiers P1 to Pm (m<n), but not for a subset of remaining implement operation parameters assigned parameter identifiers Pm+1 to Pn; and in response to receiving the response data message in the control device, limiting future data collecting messages transmitted from the control device to the control unit to requesting present parameter values for the subset of implement operation parameters assigned parameter identifiers P1 to Pm only, and preventing the future data collecting messages transmitted to the control unit from requesting present parameter values for the subset of the remaining implement operation parameters assigned parameter identifiers Pm+1 to Pn.

According to another aspect, an agricultural machine having a tractor and an implement hitched to the tractor is provided. The agricultural machine comprises: a control device provided on the tractor, wherein the control device is configured to process data indicative for a plurality of implement operation parameters assigned parameter identifiers P1 to Pn (n≥2); a control unit provided on the implement and assigned to at least one functional element of the implement; and a data bus connected to both the control device and the control unit. The control device and the control unit are configured to establish data communication between the control device and the control unit through the data bus, comprising, in response to connecting the control unit to the data bus, transmitting a response data message from the control unit to the control device, the response data message indicating the control unit being configured to provide present parameter values for only a subset of implement operation parameters assigned parameter identifiers P1 to Pm (m<n), but not for a subset of remaining implement operation parameters assigned parameter identifiers Pm+1 to Pn. In response to receiving the response data message in the control device, the following is provided: limit future data collecting messages transmitted from the control device to the control unit to requesting present parameter values for the subset of implement operation parameters assigned parameter identifiers P1 to Pm only, and prevent the future data collecting messages transmitted to the control unit from requesting present parameter values for the subset of the remaining implement operation parameters assigned parameter identifiers Pm+1 to Pn.

According to the technology proposed, in response to establishing data communication between the control device provided on the tractor and the control unit provided on the implement through the data bus, there is a step of clarifying which implement operation parameters can actually be provided by the control unit. This information is received in response in the control device on the tractor. Following, data collection messages send out in the future will be limited to requesting present parameter values only for such implement operation parameters (P1 to Pn) which are supported by the control unit. The control device is prevented from requesting present parameter values for implement operation parameters not supported by the control unit for which data communication was established. Thus, the amount of data (data traffic) through the data bus is reduced. There is no request for present parameter values transmitted by the control device for which no support is provided by the control unit.

The subset of implement operation parameters for which present values are provided by the control unit may change independents on different operation modes. For example, the control unit may receive the response data message at a first point in time at which the implement is operated according to a first mode of operation. At later point in time the control device may receive a second response data message indicating a different subset of implement operation parameters available from the control unit on the implement while a second mode of operation is applied to the operation of the implement. The second subset of implement operation parameters is different from the first subset of implement operation parameters received at the first point in time. Thus, a continuous optimization of data traffic through the data bus can be implemented by the technology proposed.

The technology may be applied for different agricultural machines for which the tractor is hitching an implement, for example, selected from the following group of implements: plough, baler, seeder, sprayer, and mower. The control unit provided on the implement may be assigned to one or more working tools provided on such implement. Such working tools provide for a functional element of the implement for which implement operation parameters are gathered.

The method may further comprise: transmitting a request data message from the control device to the control unit in response to connecting the control unit to the data bus, the request data message requesting information about which of the plurality of implement operation parameters assigned parameter identifiers P1 to Pn the control unit is configured to provide present parameter values for; and transmitting the response data message from the control unit to the control device in in response to receiving the request data message in the control unit. For this or other embodiments, data communication between the control device and the control unit may be established in the response to connecting an implement to the tractor, specifically connecting the control unit provided on the implement to the data bus. In response to establishing such connection, the control device can transmit the request data message, thereby, the control device actively requesting information about the implement operation parameters supported by the control unit. Alternatively, the control unit may submit the response data message without receiving before the request data message from the control device, for example in response to connecting the control unit to the data bus.

The categorization of the implement operation parameters allows for grouping a plurality of implement operation parameters into one category. For this embodiment the information about which implement operation parameters are actually supported by the control unit can be limited to requesting information about the parameter categories. Thus, not for each implement operation parameters separated information needs to be provided from the control unit to the control device, but only for parameter categories. The information about which implement operation parameter(s) is (are) assigned to which category is available for the control device and the control unit, for example, in a local memory. Assignment of the implement operation parameters to the parameter categories may be define at the time of implementing an operating system for controlling operation of the tractor and the implement. Such category assignment may be amended later in case of need. Still, information about the amended assignment will be available on both sites, namely in the control device and the control unit.

In an embodiment of the method, the following may be provided: the implement operation parameters assigned parameter identifiers P1 to Pn are categorized into a plurality of parameter categories C1 to Ci (i≥2), each parameter category having assigned at least one of the implement operation parameters; and, in response to connecting the control unit to the data bus, the response data message transmitted from the control unit to the control device is indicating the control unit being configured to provide present parameter values for only a subset of parameter categories C1 to Ck (k<i), but not for a subset of remaining parameter categories Ck+1 to Ci.

The method may further comprise, in response to receiving the response data message in the control device, limiting future data collecting messages transmitted from the control device to the control unit to requesting present parameter values for the subset of parameter categories C1 to Ck only, and preventing the future data collecting messages from requesting present parameter values for the subset of the remaining parameter categories Ck+1 to Ci.

The method may further comprise transmitting the data collecting messages from the control device to the control unit with a data collection frequency defining a time distance between consecutive data collecting messages. The data collection frequency may be set in response to a user input through a control terminal provided in the tractor, the control device being functionally connected to the control terminal. Alternatively, the data collection frequency may be set automatically by the software application (operating system) running on the control terminal of the tractor. There may be an option for the operator of the tractor to amend the data collection frequency, for example, for responding to different operation conditions. The consecutive data collecting messages are limited to requesting present parameter values for the subset of implement operation parameters actually supported by the control unit.

The method may comprise connecting a further control unit provided on the implement to the data bus, wherein the further control unit is assigned to at least one further functional element of the implement; and establishing data communication between the control device and the further control unit through the data bus. The establishing may comprise:
  in response to connecting the further control unit to the data bus, transmitting a further response data message from the further control unit to the control device, the further response data message indicating the further control unit being configured to provide present parameter values for only a further subset of implement operation parameters assigned parameter identifiers P1 to Px (x<n), but not for a further subset of remaining implement operation parameters assigned parameter identifiers Px+1 to Pn, wherein the further subset of implement operation parameters and the further subset of remaining implement operation parameters are different from the subset of implement operation parameters and the subset of remaining implement operation parameters, respectively; and
  in response to receiving the further response data message in the control device,
  limiting future data collecting messages transmitted from the control device to the further control unit to requesting present parameter values for the subset of implement operation parameters assigned parameter identifiers P1 to Px only, and
  preventing the future data collecting messages transmitted to the further control unit from requesting present parameter values for the further subset of the remaining implement operation parameters assigned parameter identifiers Px+1 to Pn.

In this embodiment an additional or further control unit is connected to the control device, the further control unit being assigned to another functional element of the implement, for example, to another working tool provided on the implement. The subset of implement operation parameters for which the further control unit is able to provide present parameter values is different from the subset of implement operation parameters supported by the control unit. Thus, for the control unit and the further control unit it is individually determined which subset of implement operation parameters is supported (by providing present parameter values). Again, the amount of data (data traffic) through the data bus can be optimized for each control unit. Wth respect to the parameter categories, the embodiments described above for the control unit may applied to the further control unit mutatis mutandis.

The method may further comprise transmitting the further data collecting messages from the control device to the further control unit with a further data collection frequency defining a further time distance between consecutive further data collecting messages, wherein the further data collection frequency is different from the data collection frequency. According to such embodiments, the present parameter values for the control unit and the additional (further) control unit are collected with different data collection frequency. Thereby, data collection by the control device provided on the tractor can be individually optimize for the different control units provided on the implement.

The embodiments described above with respect to the method may apply to the agricultural machine having the tractor and the implement hitched by the tractor mutatis mutandis.

BRIEF DESCRIPTION OF THE DRAWINGS

Following, further embodiments are described by referring to figures. In the figures, show:

FIG. 3 an example for a plurality of categories of implement operation parameters.

DETAILED DISCUSSION

Figure 1:
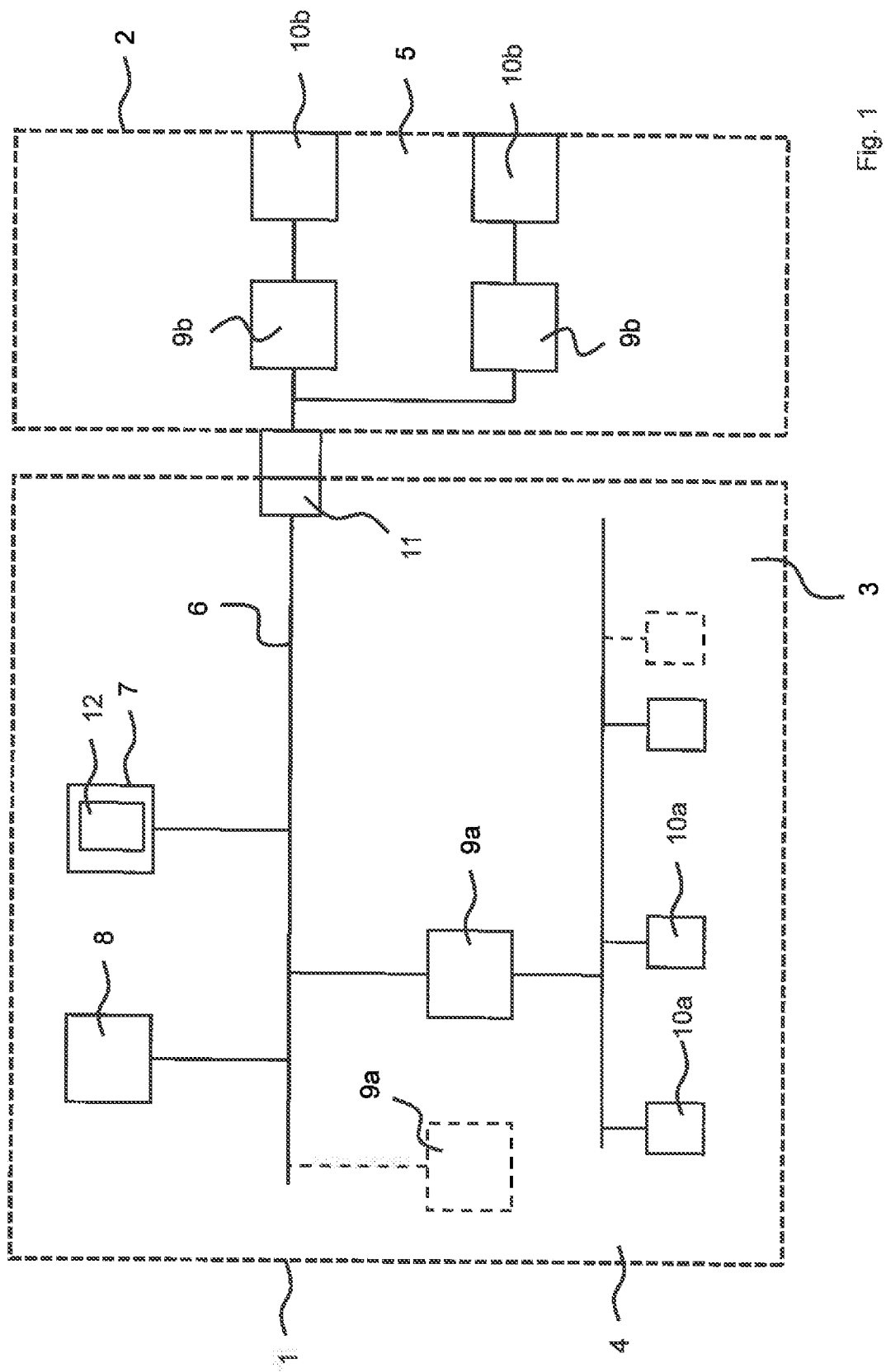
FIG. 1 a schematic representation of an agricultural system having a tractor and an implement hitched to the tractor.

FIG. 1 shows a schematic representation of an agricultural system or machine having a tractor 1 and an implement 2 hitched to or by the tractor 1.

A control network 3 provides for an electronic control system of the agricultural system. The control network 3 comprises a tractor control network 4 and an implement control network 5. The control network 3 is having a data bus 6 to which a user terminal 7, a task controller 8, and a plurality of electronic control units (ECU) 9a, 9b are connected. There are electronic control units 9a provided on the tractor 1. Other electronic control units 9b are provided on the implement. Each of the electronic control units 9a, 9b is assigned to a functional element 10a, 10b provided in the tractor 1 and the implement 2, respectively. With regard to the implement 2, the functional elements 10b may also be referred to as working or functional unit (tool). For the embodiment depicted or other embodiments, the functional elements 10b have individually assigned one (a single one) of the control units 9b. Alternatively, a single control unit 9b may be assigned to more than one of the functional elements 10b.

Through the data bus 6 electronic data may be transmitted between the components, units, modules or elements connected to the data bus 6. The electronic control system of the agricultural system control network 3 may implement the ISO 11783 standard, preferably the ISO 11783-11 standard.

The data bus 6 is provided with a plug connector 11 connecting the tractor control network 4 and the implement control network 5.

The user or operator terminal 7, according to the example depicted, is provided with a control device 12 which, in an alternative embodiment, may be provided separated from the user terminal 7, but still functionally connected to the data bus 6. The control device 12 comprises one or more processors and memory assigned to the one or more processors. One or more software application are implemented for running the control device 12.

The user terminal 7 may comprise a terminal display (not shown). In such embodiment, the user terminal provides for user control and user display. Further, the user terminal 7 may be provided with a processor unit comprising a processor and a memory element connected to the processor. Multiple software applications implemented on the user terminal may be running simultaneously.

Through the user terminal 7 user input may be received for controlling the functional elements 10a, 10b of the agricultural machine or system. Also, through the terminal display 12 operation information may be displayed to the user.

Figure 2:
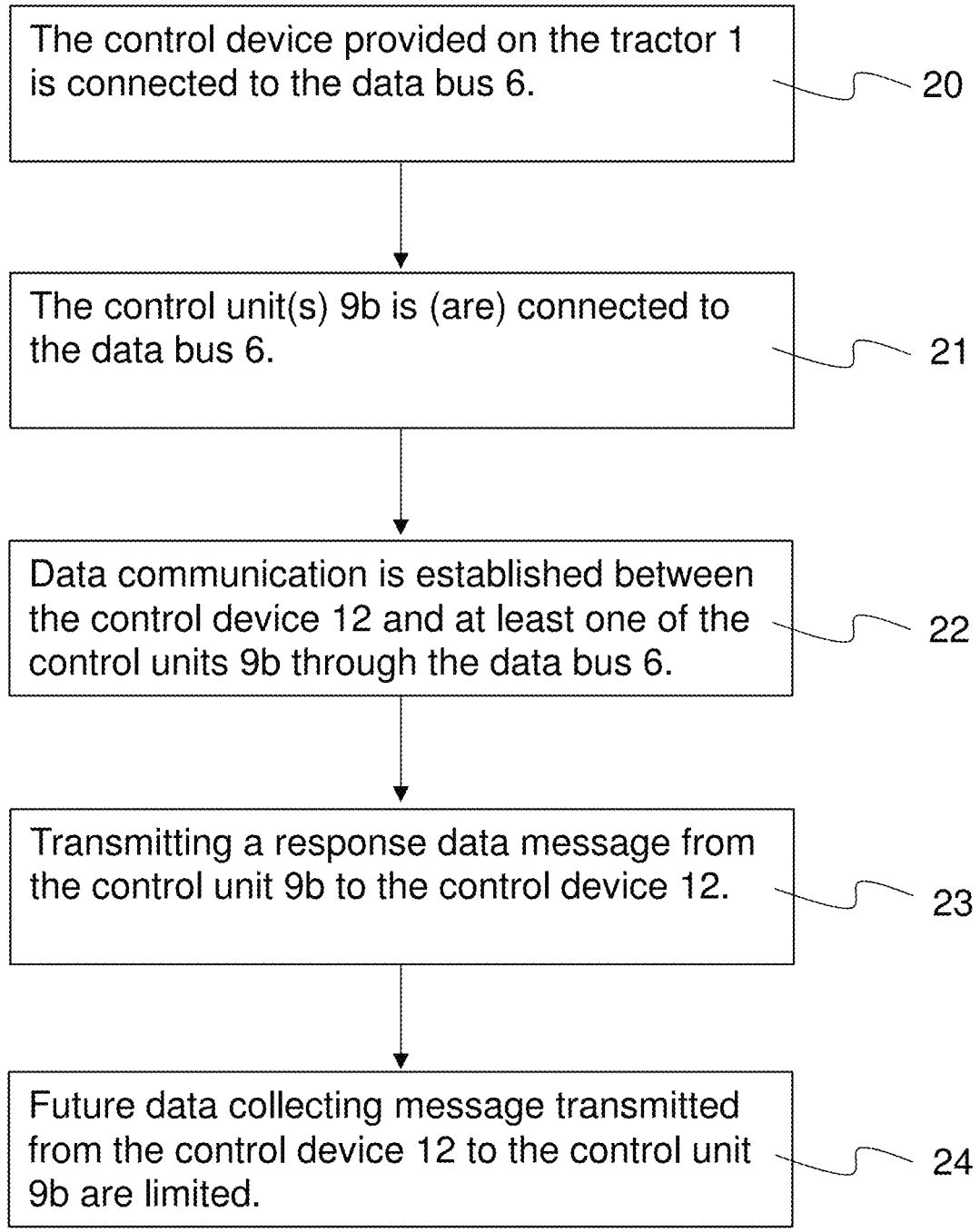
FIG. 2 a schematic block diagram for a method for operating the agricultural machine in FIG. 1.

FIG. 2 shows a schematic representation of a block diagram for a method for operating the agricultural system or machine depicted in FIG. 1. In step 20 the control device provided on the tractor 1 is connected to the data bus 6. The control device 12 is configured to process data indicative for a plurality of implement operation parameters assigned parameter identifiers P1 to Pn (n≥2). Such data for the implement operation parameters are collected on the implement 2 by the control unit(s) 9b and received by the control device 12 through the data bus 6 from the implement 2. The control unit(s) 9b is (are) connected to the data bus 6 in step 21.

In step 22 data communication is established between the control device 12 and at least one of the control units 9b through the data bus 6. The establishing of the data communication comprises, in step 23, transmitting a response data message from the control unit 9b to the control device 12. The response data message may be generated in the control unit 9b in response to receiving a request data message from the control device 12, the request data message requesting information about which of the plurality of implement operation parameters assigned parameter identifiers P1 to Pn the control unit 9b is configured to provide present parameter values for. The response data message is indicating the control unit 9b being configured to provide present parameter values for only a subset of implement operation parameters assigned parameter identifiers P1 to Pm (m<n), but not for a subset of remaining implement operation parameters assigned parameter identifiers Pm+1 to Pn. The control unit 9b only supports providing present parameter values for the implement operation parameters P1 to Pm. Contrary, a control unit is not able (under the current mode of operation) to provide present parameter values for the remaining implement operation parameters Pm+1 to Pn.

In step 24, future data collecting message transmitted from the control device 12 to the control unit 9b are limited to requesting present parameter values for the subset of implement operation parameters P1 to Pm only. The future data collecting messages transmitted to the control unit 9b are prevented from requesting present parameter values for the subset of remaining implement operation parameters Pm+1 to Pn. Consequently, the control device 12 is prevented from unnecessary or needless request for data indicative of present parameter values for implement operation parameters for which a control unit 9b can and will not provide electronic information.

The method described above with reference to the control unit 9b provided on the implement 2 may be applied mutatis mutandis for the control unit(s) 9a on the tractor 1 alternatively or in addition.

FIG. 3 shows an example for implement operation parameters categorized. There are categories C1 to C3. Categories C1 and C2 refer to general parameters which may be applied for different implements. But, category C3, in the embodiment described, refers to plough specific parameters.

The following abbreviations have been applied in FIG. 3: ACT—Actuator, PCB—Printed Circuit Board, UT—Universal Terminal, and ECU—Electronic Control Unit (in the present embodiment: Electronic Control Unit of the Plough).

Following, further information with regard to parameter identifier, parameters and indices depicted in FIG. 3 is provided.

Actuator Power 1/2 (on a plough) refers to "actuator to steer a hydraulic valve" (on a 12V basis). ACT Power 5V steers a different actuator which only needs 5V.

For category C1, index 0 is assigned to the ECU power 1. For category C1, index 5 is assigned to ACT power 2 (actuator power 2). Index 1 to index 4, for category C1, may be used but for other implements but not for a plough.

CAN 1 High refers to voltage of the high line of the CAN bus—measuring the voltage in a range e.g. from 0 to 3.3 Volt; CAN 1 Low refers to voltage of the low line of the CAN bus—measuring the voltage in a range e.g. from 0 to 3.3 Volt CAN1 could be the CAN bus responsible for the ISOBUS communication. CAN2 can be seen as an internal CAN bus communication, e.g. for internal peripherals (all communication which needs not to be assigned to ISOBUS communication and does not need to be compliant to ISOBUS standards).

For category C2, P10 refers to assignment of instance numbers to specific terminals: the implement is able to re-member to which terminal it was connected last time.

With respect to category C3, the following parameter identifier are applied:

P13: plough specific mode: e.g. could be "connected to tractor=connecting mode" or "ploughing mode=when implement is out in the field and ploughing)=mode entered (see P20 below);

P15: Plough may have different pre-defined preset numbers according to the necessary conditions on different fields;

P16-P19: count of error messages like in these specific cases=amount of blockages, determined by sensors; and P20-P23: confirmation signals=confirming that P13 of category C3 has really been applied.

The features disclosed in this specification, the figures and/or the claims may be material for the realization of various embodiments, taken in isolation or in various combinations thereof.

What is claimed is:

1. A method for operating an agricultural machine having a tractor and an implement hitched to the tractor, the method comprising:
    connecting a control device provided on the tractor to a data bus, wherein the control device is configured to process data indicative for a plurality of implement operation parameters assigned parameter identifiers P1 to Pn (n≥ 2);
    connecting a control unit provided on the implement to the data bus, wherein the control unit is assigned to at least one functional element of the implement; and
    establishing data communication between the control device and the control unit through the data bus, comprising:
        in response to connecting the control unit to the data bus, transmitting a response data message from the control unit to the control device, the response data message identifying a subset of implement operation parameters assigned parameter identifiers P1 to Pm (m<n) for which the control unit is configured to provide present parameter values; and
        in response to receiving the response data message in the control device,
            limiting, by the control device, future data collecting messages transmitted from the control device to the control unit to requesting present parameter values for the subset of implement operation parameters assigned parameter identifiers P1 to Pm only, and
            preventing the future data collecting messages transmitted to the control unit from requesting present parameter values for a subset of remaining implement operation parameters assigned parameter identifiers Pm+1 to Pn.

2. The method of claim 1, further comprising:
    transmitting a request data message from the control device to the control unit in response to connecting the control unit to the data bus, the request data message requesting information about which of the plurality of implement operation parameters assigned parameter identifiers P1 to Pn the control unit is configured to provide present parameter values for; and
    transmitting the response data message from the control unit to the control device in response to receiving the request data message in the control unit.

3. The method of claim 2, wherein
    the implement operation parameters assigned parameter identifiers P1 to Pn are categorized into a plurality of parameter categories C1 to Ci (i≥ 2), each parameter category having assigned at least one of the implement operation parameters; and
    in response to connecting the control unit to the data bus, the response data message transmitted from the control unit to the control device is indicating the control unit being configured to provide present parameter values for only a subset of parameter categories C1 to Ck (k<i), but not for a subset of remaining parameter categories Ck+1 to Ci.

4. The method of claim 1, wherein
    the implement operation parameters assigned parameter identifiers P1 to Pn are categorized into a plurality of parameter categories C1 to Ci (i≥ 2), each parameter category having assigned at least one of the implement operation parameters; and
    in response to connecting the control unit to the data bus, the response data message transmitted from the control unit to the control device is indicating the control unit being configured to provide present parameter values for only a subset of parameter categories C1 to Ck (k<i), but not for a subset of remaining parameter categories Ck+1 to Ci.

5. The method of claim 4, further comprising, in response to receiving the response data message in the control device,
    limiting future data collecting messages transmitted from the control device to the control unit to requesting present parameter values for the subset of parameter categories C1 to Ck only, and
    preventing the future data collecting messages from requesting present parameter values for the subset of the remaining parameter categories Ck+1 to Ci.

6. The method of claim 1, further comprising transmitting the data collecting messages from the control device to the control unit with a data collection frequency defining a time distance between consecutive data collecting messages.

7. The method of claim 1, further comprising:
connecting a further control unit provided on the implement to the data bus, wherein the further control unit is assigned to at least one further functional element of the implement; and
establishing data communication between the control device and the further control unit through the data bus, comprising:
in response to connecting the further control unit to the data bus, transmitting a further response data message from the further control unit to the control device, the further response data message indicating the further control unit being configured to provide present parameter values for only a further subset of implement operation parameters assigned parameter identifiers P1 to Px (x<n), but not for a further subset of remaining implement operation parameters assigned parameter identifiers Px+1 to Pn, wherein the further subset of implement operation parameters and the further subset of remaining implement operation parameters are different from the subset of implement operation parameters and the subset of remaining implement operation parameters, respectively; and
in response to receiving the further response data message in the control device,
limiting future data collecting messages transmitted from the control device to the further control unit to requesting present parameter values for the subset of implement operation parameters assigned parameter identifiers P1 to Px only, and
preventing the future data collecting messages transmitted to the further control unit from requesting present parameter values for the further subset of the remaining implement operation parameters assigned parameter identifiers Px+1 to Pn.

8. The method of claim 7, further comprising transmitting the further data collecting messages from the control device to the further control unit with a further data collection frequency defining a further time distance between consecutive further data collecting messages, wherein the further data collection frequency is different from the data collection frequency.

9. An agricultural machine having a tractor and an implement hitched to the tractor, comprising:
a control device provided on the tractor, wherein the control device is configured to process data indicative for a plurality of implement operation parameters assigned parameter identifiers P1 to Pn (n≥ 2);
a control unit provided on the implement and assigned to at least one functional element of the implement; and
a data bus connected to both the control device and the control unit;
wherein the control device and the control unit are configured to establish data communication between the control device and the control unit through the data bus, comprising:
in response to connecting the control unit to the data bus, transmitting a response data message from the control unit to the control device, the response data message identifying a subset of implement operation parameters assigned parameter identifiers P1 to Pm (m<n) for which the control unit is configured to provide present parameter values; and
in response to receiving the response data message in the control device,
limit, by the control device, future data collecting messages transmitted from the control device to the control unit to requesting present parameter values for the subset of implement operation parameters assigned parameter identifiers P1 to Pm only, and
prevent the future data collecting messages transmitted to the control unit from requesting present parameter values for a subset of remaining implement operation parameters assigned parameter identifiers Pm+1 to Pn.

* * * * *